United States Patent
Jacques Portefaix

[19]

[11] Patent Number: 6,109,867

[45] Date of Patent: Aug. 29, 2000

[54] COOLED TURBINE-NOZZLE VANE

[75] Inventor: Laurent Roger Jacques Portefaix, Champagne S/Seine, France

[73] Assignee: Societe Nationale d'Etude et de Construction de Moteurs d'Aviation "S.N.E.C.M.A.", France

[21] Appl. No.: 09/199,777

[22] Filed: Nov. 25, 1998

[30] Foreign Application Priority Data

Nov. 27, 1997 [FR] France .................................. 97 14896

[51] Int. Cl.⁷ .......................................................... F01D 5/14
[52] U.S. Cl. .......................... 415/115; 415/110; 415/116; 416/97 R; 416/96 A
[58] Field of Search ................................ 415/115, 174.5, 415/110, 116, 173.4, 173.5, 173.7, 174.4; 416/96 A, 96 R, 97 R

[56] References Cited

U.S. PATENT DOCUMENTS

| | | |
|---|---|---|
| 3,628,880 | 12/1971 | Smuland et al. . |
| 3,767,322 | 10/1973 | Durgin et al. .............................. 416/97 |
| 3,781,129 | 12/1973 | Aspinwall . |
| 3,994,622 | 11/1976 | Schultz et al. . |
| 4,288,201 | 9/1981 | Wilson . |
| 4,962,640 | 10/1990 | Tobery ..................................... 60/39.02 |
| 5,358,374 | 10/1994 | Correia et al. ............................ 415/47 |

*Primary Examiner*—Edward K. Look
*Assistant Examiner*—Ninh Nguyen
*Attorney, Agent, or Firm*—Bacon & Thomas PLLC

[57] ABSTRACT

A turbine-nozzle vane fitted with a cooling system including a hollow airfoil (45) inserted between an outer deck and an inner deck (46). Disposed inside the airfoil (45) is a liner (60) which is fitted with a multi-perforated skirt to impact-cool the airfoil wall. The liner (60) has an inner wall (62) comprising a female frustum of a cone (66). A male frustum of a cone (64) is rigidly affixed to the inner deck (46) and is nested in the female frustum (66). These frusta provide communication between the inside of the liner (60) and the inside of the inner deck (46). Cooling air (70) is introduced into the liner (60) through the outer deck. A portion (71) of this air impact-cools the airfoil wall. Another portion (72) enters the inner deck (46) and passes through an orifice (67) to cool the turbine disks (49, 50) upstream and downstream of the nozzle.

1 Claim, 4 Drawing Sheets

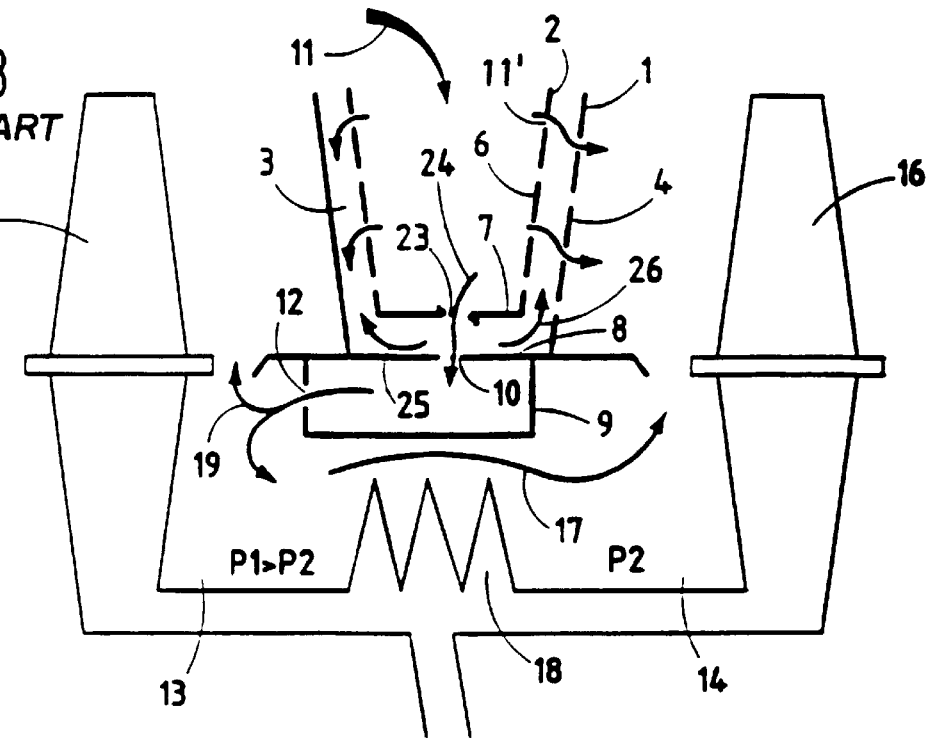
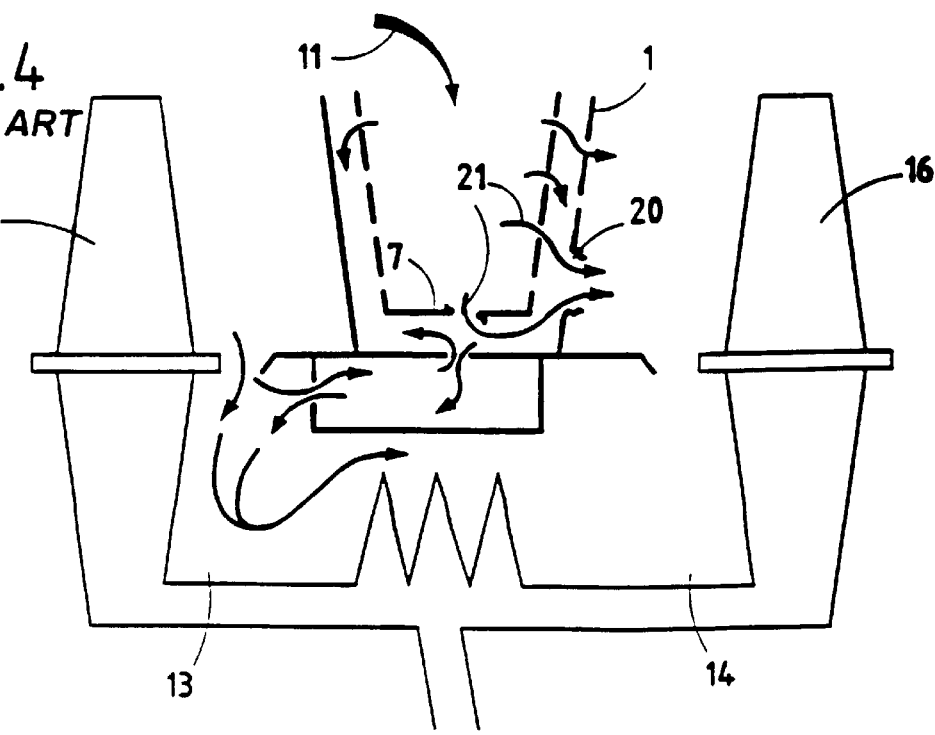

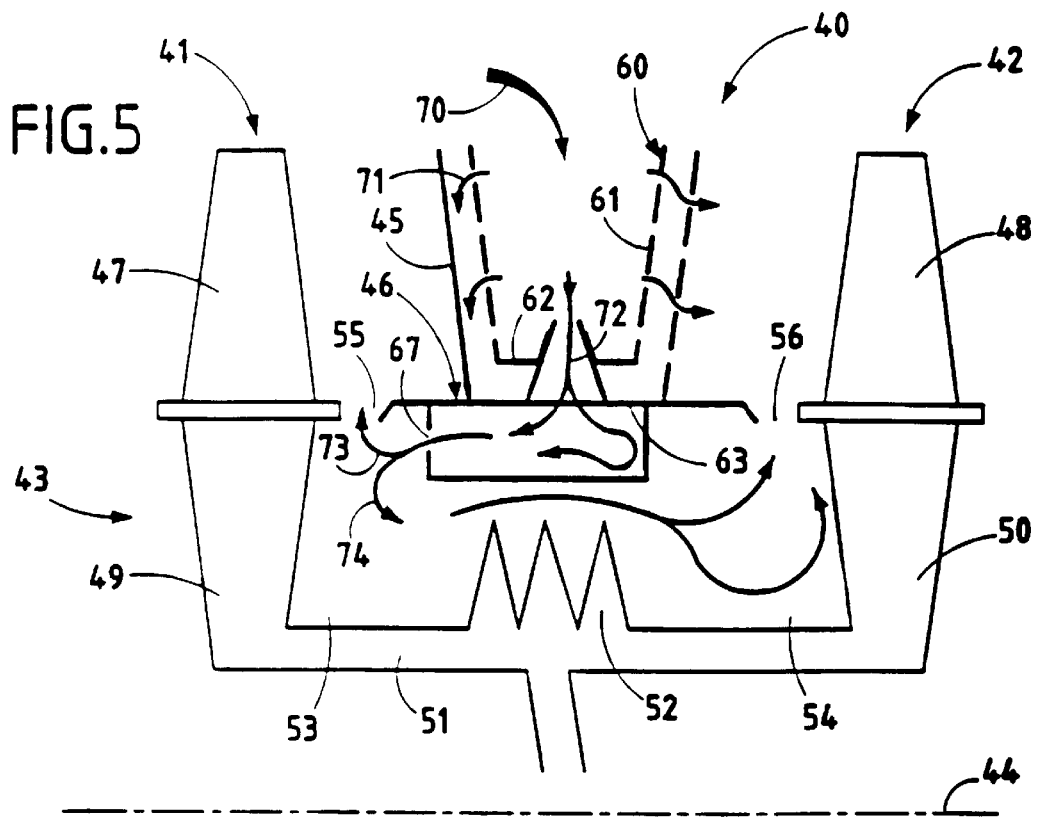
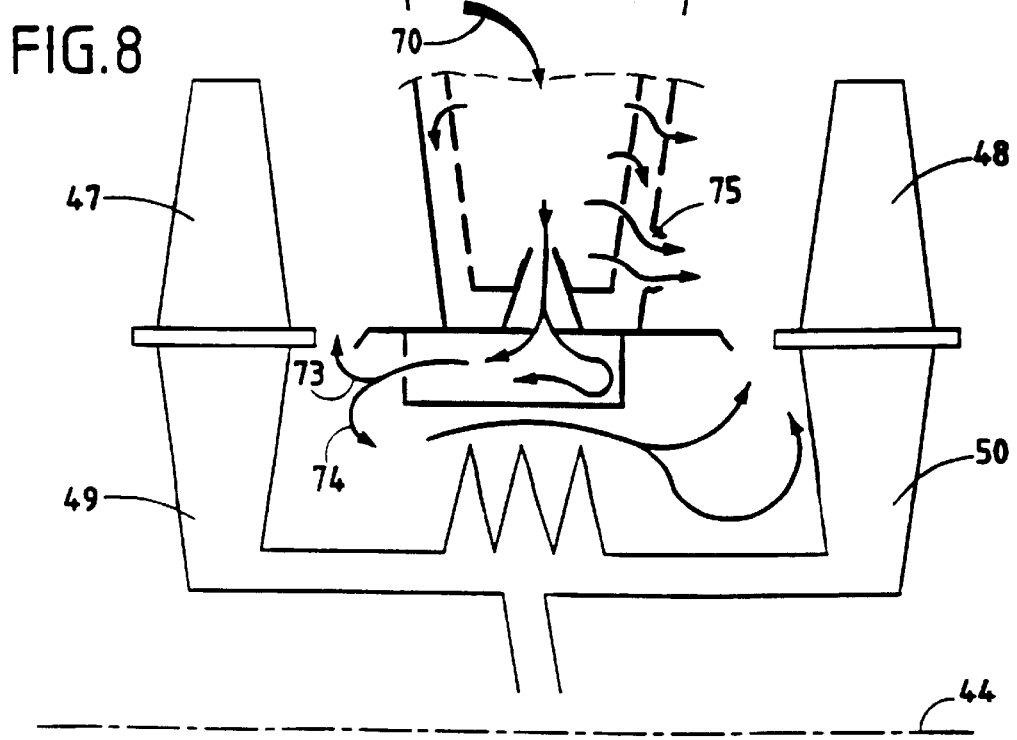

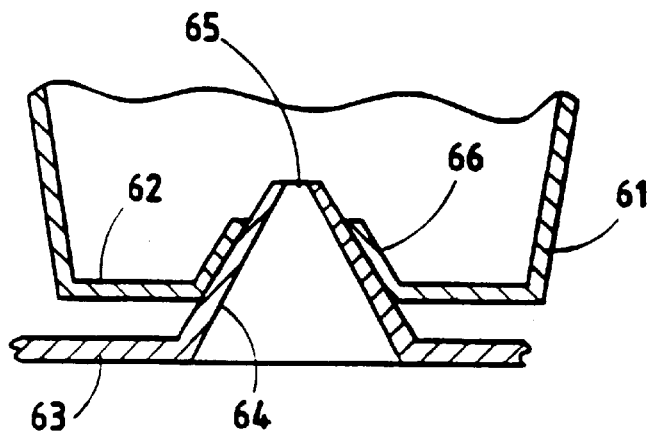
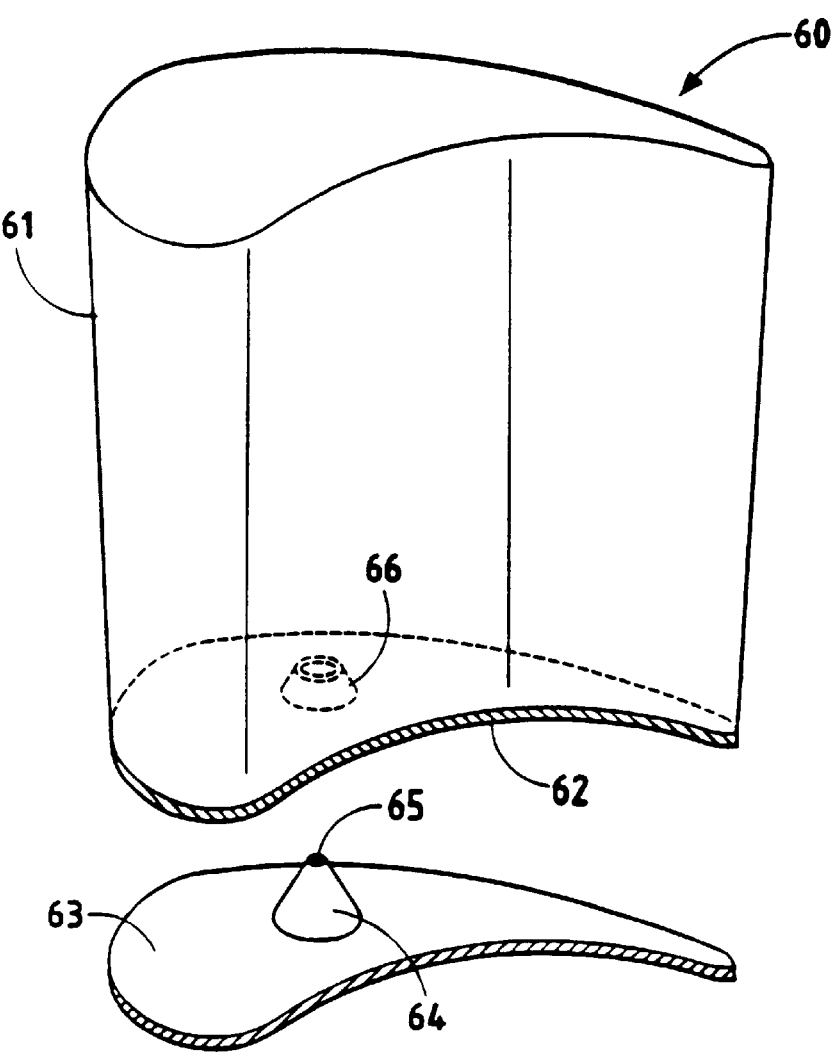

ing and cools the inner deck. This air is exhausted at the upstream side of the inner deck toward a labyrinth separating an upstream enclosure from a downstream enclosure and toward the hot-gas flow upstream of the nozzle.

COOLED TURBINE-NOZZLE VANE

BACKGROUND OF THE INVENTION

1. Field of the Invention

The invention relates to high-pressure turbine nozzles of gas-turbine engines, in particular aircraft gas-turbine engines.

2. Description of the Related Art

It is known that increasing the temperature at the intake of the turbine(s) of a gas-turbine engine allows optimization of the performance of the gas-turbine engine. Increasing the temperature provides a gain in specific fuel consumption, increasing the aircraft's range or decreasing the amount of fuel that must be carried along. This temperature increase also increases the thrust of the gas-turbine engine. Present-day engines can operate with a temperature of 1,577° C., whereas the gas-turbine engines of 1950 (for instance the ATAR design) were limited to 930° C.

A cooling system for the nozzle vanes and the turbine wheel is required for operating at such temperatures. To this end, a systematic circulation of cooling air is established inside the vane and perforations are formed in the vane wall which are suitably configured to create a vane protective film. Cooling is implemented by two substantial methods, namely internal convection and the protective film.

FIGS. 1 and 2 show the design presently used on the CF6-80 and GE 90 engines.

The vane comprises a hollow airfoil 1 inserted between a hollow outer deck and a hollow inner deck 9. The airfoil 1 contains a liner 2 defining a continuous peripheral cavity 3 between a wall 4 of the airfoil 1 and the outside of the liner 2. Spacers affixed to the wall 4 or the liner 2 keep the liner 2 and the wall 4 apart. The liner 2 comprises a multi-perforated skirt 6 and an inner wall 7 spaced a distance away from a wall 8 separating the airfoil 1 from the inner deck 9. The wall 8 is fitted with an orifice 10. An airflow 11 coming from a compressed-air source, generally the compressor of the gas-turbine engine, passes through the outer deck, enters the inside of the liner 2 and exhausts through the multi-perforation of the skirt 6 forming air jets 11' in the peripheral cavity 3 to impact-cool the wall 4 of the airfoil 1. Next, this airflow 11 passes inside and across the inner deck 9, which is cooled thereby, to finally exhaust as cooling airflow 19 through orifices 12 located at the upstream side of the inner deck 9. The pressure P1 in an upstream enclosure 13 is larger than the pressure in a downstream enclosure 14. These enclosures are bounded by the inner deck 9 and an upstream turbine disk 15 and a downstream turbine disk 16, respectively. An airflow will be set up through a labyrinth 18 separating the enclosures 13 and 14 which determines the magnitude of an airflow 17. This airflow 17 is expelled into the path of hot gases downstream of the nozzle to cool the periphery of the downstream disk 16. The remainder of the cooling airflow 19 coming from the orifices 12 is expelled into the path of hot gases upstream of the nozzle to cool the periphery of the upstream turbine disk 15. In this manner, these airflows 17 and 19 cool the high-pressure turbine disks. By this simple technical configuration, the total cooling airflow 11 injected inside the liner 2 initially acts to cool the airfoil 1.

However, the air injected inside the airfoil 1 must descend again to the airfoil base to be exhausted through the inner deck 9. As a result, the flow for impact-cooling is sheared, impeding mathematical modeling. Because the air cooling the inner deck 9 and the turbine disks 15, 16 was already heated when cooling the wall 4 of the airfoil 1, the cooling of the inner deck 9 and the turbine disks 15, 16 is degraded.

If a crack 20 materializes at the trailing edge of the airfoil 1 in the manner shown in FIG. 2, at least a portion 21 of the flow of cooling air will pass through the crack 20. Since the pressure downstream of the vane is less than the pressure upstream, there is a danger of flow reversal inside the inner deck 9 which is crossed by a flow 22 of hot gases coming from the upstream part of the nozzle and passing through the upstream enclosure 13. In this case, the inner deck 9 will be heated and serious damage to, even destruction of, the vane may ensue. The flow underneath the inner deck 9 arises directly from the very hot gas of the gas flow path, entailing dangerous rotor heating and possibly destruction of the entire turbine if the inner deck 9 is not cooled properly.

FIGS. 3 and 4 show another embodiment of the cooling circuit which is similar to the embodiment of FIGS. 1 and 2. In this case, the inner wall 7 of the liner 2 comprises an outlet orifice 23 opposite an intake orifice 10 in the inner deck 9. Accordingly, the cooling airflow 11 enters the liner 2 and a portion 24 of this cooling air directly crosses the outlet orifice 23 to circulate in and cool the inner deck 9. As in the embodiment shown in FIGS. 1 and 2, the air circulating in the inner deck 9 is exhausted through the orifice 12 situated upstream of the inner deck 9, with one portion 17 crossing the labyrinth 18 while the other portion 19 is expelled into the path of hot gases upstream of the nozzle, thereby cooling the turbine disks 15 and 16.

In this second design, the air cooling the inner deck 9 and the disks 15, 16 is desirably fresher and the shearing flow of the impact-cooling air is less. On the other hand, the airfoil 1 is disadvantageously cooled by a lesser flow. Moreover, leaks 25, 26 may escape from the outlet orifice 23 into the peripheral cavity 3, complicating mathematical flow modeling.

If a crack 20 appears at the trailing edge of the airfoil 1 in the manner shown in FIG. 4, a portion 21 of the cooling air will escape into the hot-gas flow and, depending on engine operating conditions, the air's magnitude of flow in the inner deck 9 will be reduced or it's direction will be reversed. The inner deck 9 and the airfoil 1 also may be damaged or destroyed. Overheating in the enclosures 13 and 14 may dangerously raise the rotor temperature causing disk expansion and leading to contact between movable components and stationary rings.

According to the two embodiments of the state of art described above, the wall 4 of the airfoil 1 is furthermore fitted with gauged orifices to form a protective film around the airfoil.

SUMMARY OF THE INVENTION

Based on this state of the art, the objective of the invention is to create a nozzle vane wherein fluid circulation in the inner deck is prevented from reversing itself in the event a crack is formed at the trailing edge of the airfoil.

Accordingly, the invention concerns a turbine-nozzle vane fitted with a cooling system. The vane comprises a hollow airfoil inserted between a hollow outer deck and a hollow inner deck. A liner is mounted inside the airfoil and fitted with a multi-perforated skirt which is kept away from the peripheral airfoil wall. The liner also has an inner wall in which an outlet orifice is formed opposite an intake orifice in an outer wall of the inner deck. The inner wall is also kept spaced from the outer wall. The inside of the liner is supplied with cooling air from the outer deck. One portion of this cooling air impact-cools the airfoil and the other circulates inside the inner deck from where it exhausts through an orifice located upstream of the inner deck in order to cool the turbine disks. The airfoil wall moreover includes gauged orifices to create a protective film outside the airfoil.

This vane is characterized in that the outlet orifice in the liner's inner wall and the intake orifice in the inner deck communicate with each other by a seal which precludes direct communication between the inside of the inner deck and the cavity bounded by the peripheral airfoil wall and the outside of the liner.

Due to this design, the airflow which impact-cools the airfoil is prevented from mixing with the airflow through the outlet orifice. Thus, the inner deck is always cooled with fresh air, even if a crack forms in the trailing airfoil edge.

Preferably, the seal comprises two conical frusta nesting in each other. The apex openings or top apertures are disposed inside the liner. The male frustum is rigidly joined to the inner deck and bounds the intake orifice. The female frustum is rigidly joined to the liner and bounds the outlet orifice.

This design allows axial attachment of components which prevents the liner from moving laterally.

BRIEF DESCRIPTION OF THE DRAWINGS

Other features and advantages of the invention are shown in the following illustrative description of the invention, with reference to the attached drawings, in which:

FIGS. 1–4 are sectional views taken in a radial plane through a turbine axis of rotation of a nozzle vane of the prior art, with FIGS. 1 and 2 showing a first embodiment of a cooling circuit and FIGS. 3 and 4 showing a second embodiment of a cooling circuit;

FIG. 5 is a sectional view taken in a radial plane through the axis of rotation of the turbine of a nozzle vane of the present invention;

FIG. 6 is a larger scale view showing an embodiment of the seal for communication between the inside of the liner and the inner deck;

FIG. 7 is an exploded view of the outer wall of the inner deck and the liner; and FIG. 8 is a sectional view similar to that of FIG. 5 showing cooling air circulations in the event of a crack in the trailing edge of the airfoil.

DETAILED DESCRIPTION OF THE PREFERRED EMBODIMENT

Figure 1:
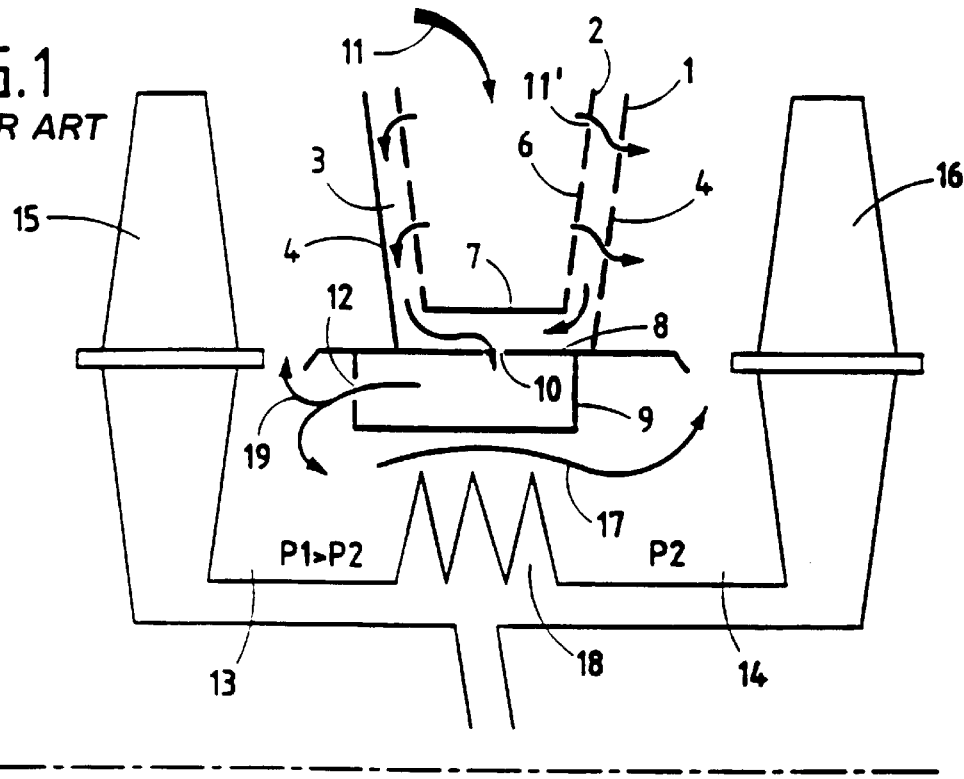
Figure 2:
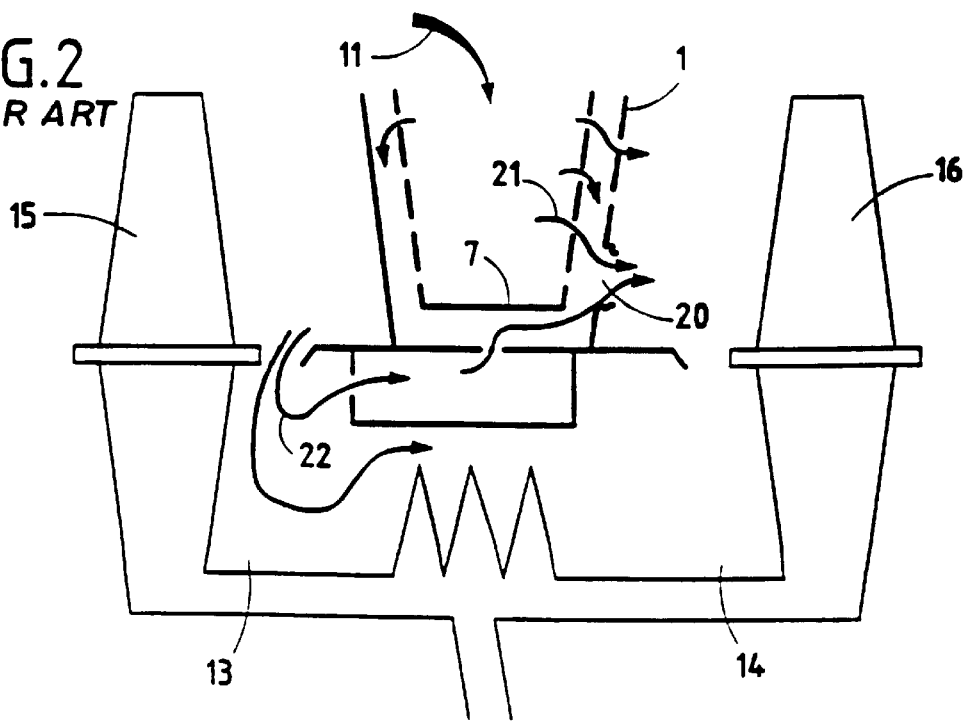

FIG. 5 shows a stationary vane 40 of a nozzle between the wheels 41 and 42 of a two-stage, high-pressure turbine 43 having an axis of rotation 44. In a known manner, the vane 40 comprises a hollow, aerodynamic airfoil 45 between a hollow outer deck 76 and an inner deck 46. An assembly of a plurality of the nozzle vanes 40 is disposed annularly to form a ring and a hot-gas flow coming from a cascade of movable blades 47 of the upstream wheel 41 of the turbine 43 is deflected by the airfoils 45 before impinging a cascade of movable blades 48 of the downstream wheel 42. The outer decks bound an outer contour of the hot-gas path whereas the inner decks 46 bound an inner contour of the path.

In addition to the blades 47 and 48, the wheels 41 and 42 comprise disks 49 and 50, respectively, which are connected by a drum 51 which drives a shaft (not shown). The drum 51 comprises a labyrinth 52 opposite the inner deck 46 which separates the annular space between the inner deck 46 and the drum 51 into an upstream enclosure 53 and a downstream enclosure 54. These enclosures 53, 54 communicate with the hot-gas path through interstices 55, 56 separating the inner deck 46 from the turbine disks 49, 50.

The internal cavity of the airfoil 45 contains a liner 60 which comprises a multi-perforated skirt 61 and an inner wall 62 located near but spaced away from an outer wall 63 separating the inside of the airfoil 45 from the inside of the inner deck 46. The outer wall 63 comprises a male frustum of a cone 64 which bounds an intake orifice 65 opening into the internal cavity of the inner deck 46. The male frustum 64 nests in a female frustum of a cone 66 formed in the outer wall 63 which bounds an outlet orifice. At its upstream side, the inner deck 46 furthermore comprises an orifice 67 providing communication between the inside of the inner deck 46 and the upstream enclosure 53.

The liner 60 is spaced away from the peripheral wall of the airfoil 45 by spacers and is supplied with cooling air 70 from the outer deck. A first portion 71 of this cooling air is passed through the multi-perforation of the skirt 61 and impact-cools the peripheral wall of the airfoil 45. The wall of the airfoil 45 comprises gauged orifices to allow passage of the first portion 71 into the path of the hot gases while forming a protective film around the airfoil. A second portion 72 of the cooling air enters the inner deck 64 through the intake orifice 65 at the top of the male frustum 64 and is passed through orifice 67 toward the upstream enclosure 53. The pressure P1 in the upstream enclosure 53 is higher than the pressure P2 in the downstream enclosure 54. Thus, an airflow at the orifice 67 of the inner deck 46 is divided into a first flow 73, which returns to the hot-gas path upstream of the nozzle through the interstice 55 after having cooled the periphery of the upstream disk 49, and a second flow 74, which crosses the labyrinth 52 and the downstream enclosure 54 and returns to the hot-gas path downstream of the nozzle through the interstice 54 after having cooled the periphery of the downstream disk 50.

Communication between the inside of the liner 60 and the inside of the inner deck 46 is implemented by the two frusta 64 and 66 which are mutually nested in a sealing manner. These two frusta moreover determine the respective axial positions of the liner 60 and the airfoil 45 and laterally affix the inner wall 62 of the liner 60 in the internal cavity of the airfoil 45.

The airflow 72 cooling the turbine disks 49, 50 is kept separate from the airflow 71 cooling the airfoil wall even in the presence of a crack 75 in the trailing edge of the airfoil 45 in the manner shown in FIG. 8.

The present invention is not restricted to the above-described embodiment, but on the contrary contemplates all variations that might be introduced without departing from the spirit or scope of the invention as set forth in the following claims.

I claim:

1. A turbine-nozzle vane fitted with a cooling system, said vane comprising:
   a hollow airfoil (45) inserted between a hollow outer deck (76) and a hollow inner deck (46), the inner deck (46) having an outer wall (63) with an intake orifice formed therein and an upstream wall with an exhaust orifice (67) formed therein;
   a liner (60) mounted inside the airfoil (45) to define a cavity therebetween and bounded thereby, the liner (60) being fitted with a multi-perforated skirt (61) and an inner wall (62), the skirt being kept spaced apart from the airfoil (45);
   an outlet orifice formed in the inner wall (62) of the liner (60) opposite the intake orifice in the outer wall (63) of the inner deck (46); and a seal providing communication between the outlet orifice in the inner wall (62) of the liner (60) and the intake orifice in the outer wall (63) of the inner deck (46), the seal precluding direct communication between the inner deck (46) and the cavity bounded by the airfoil (45) and the liner (60);

wherein a cooling airflow (70) is fed into the liner (60) from the outer deck (76) with a portion (71) impact-cooling the airfoil (45) through the multi-perforated skirt (61) and the other portion (72) circulating in the inner deck (46) through the seal and then exhausting through the exhaust orifice (67) to cool turbine disks (49,50) of a gas-turbine engine; and wherein the seal comprises a hollow female frustum of a cone (66) having a top aperture, the female frustum (66) being rigidly joined to the inner wall (62) of the liner (60) and bounding the outlet orifice, a hollow male frustum of a cone (64) having a top aperture, the male frustum (64) being rigidly joined to the outer wall (63) of the inner deck (46) and bounding the intake orifice, and wherein the male frustum (64) is nested in the female frustum (66) with the top apertures disposed within the liner (60).

* * * * *

UNITED STATES PATENT AND TRADEMARK OFFICE
CERTIFICATE OF CORRECTION

PATENT NO. : 6,109,867
DATED : August 29, 2000
INVENTOR(S) : Jacques Portefaix

It is certified that error appears in the above-identified patent and that said Letters Patent is hereby corrected as shown below:

Column 1,
Line 43, "wail" should read -- wall --.

Signed and Sealed this

Tenth Day of September, 2002

Attest:

Attesting Officer

JAMES E. ROGAN
Director of the United States Patent and Trademark Office